United States Patent [19]

Shimajiri et al.

[11] 4,355,446
[45] Oct. 26, 1982

[54] AUTOMATIC TOOL CHANGER OF MACHINING CENTER

[75] Inventors: Tokiji Shimajiri, Kawasaki; Kenichi Toyoda, Hino; Takahumi Yamazaki, Suita, all of Japan

[73] Assignee: Fujitsu Fanuc Limited, Tokyo, Japan

[21] Appl. No.: 81,794

[22] Filed: Oct. 4, 1979

[30] Foreign Application Priority Data

Oct. 14, 1978 [JP] Japan .................. 53/126373

[51] Int. Cl.³ .................. B23B 39/20; B23Q 3/157
[52] U.S. Cl. .................. 29/26 A; 29/568; 408/3; 408/35; 409/80; 318/594
[58] Field of Search .............. 29/26 A, 568; 409/80; 408/35, 3; 318/594

[56] References Cited

U.S. PATENT DOCUMENTS 3,069,608 12/1962 Forrester et al. .............. 409/80 X
4,053,251 10/1977 Shichida et al. .................. 408/35

Primary Examiner—Z. R. Bilinsky
Attorney, Agent, or Firm—Staas & Halsey

[57] ABSTRACT

A vertical-type machining center having a spindle carrier which travels in the vertical direction and a turret capable of both rotation and upward and downward movement provided on the spindle carrier, wherein tools are automatically changed over through rotation of the turret caused by relative movement between the turret and the spindle carrier when the upward movement of the turret is checked by a restraining member. A Z-axis position pulse generator is provided on a spindle mechanism drive member, such as the vertical drive motor or a screw shaft, and is adapted to generate a pulse for each revolution of the drive member. The pulses are counted by a counter which delivers a counted value for use in computing the vertical position of the spindle mechanism. The arrangement is such that the rotational speed of the vertical drive motor is controlled so as to move the spindle mechanism at an optimum speed suitable for the vertical position thereof.

7 Claims, 14 Drawing Figures

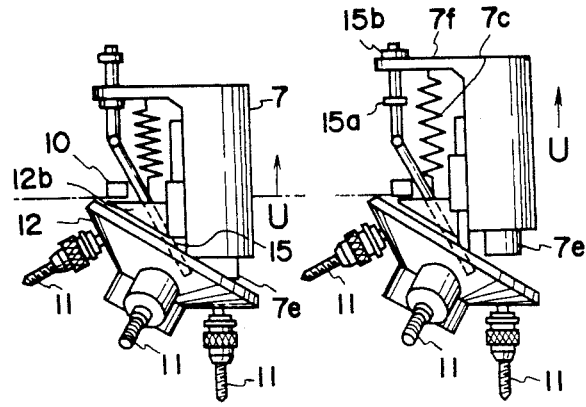
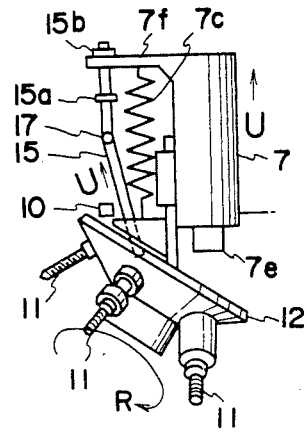
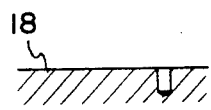
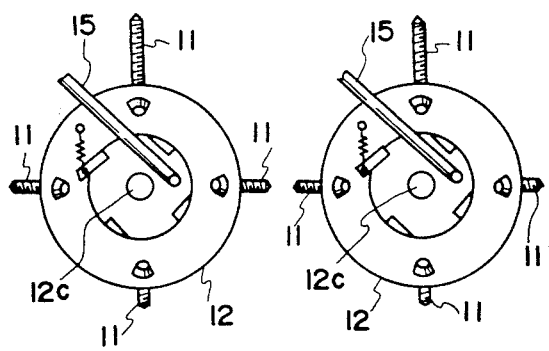
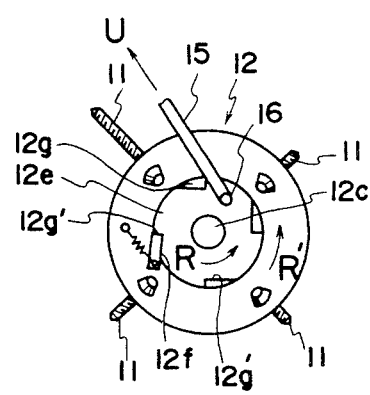

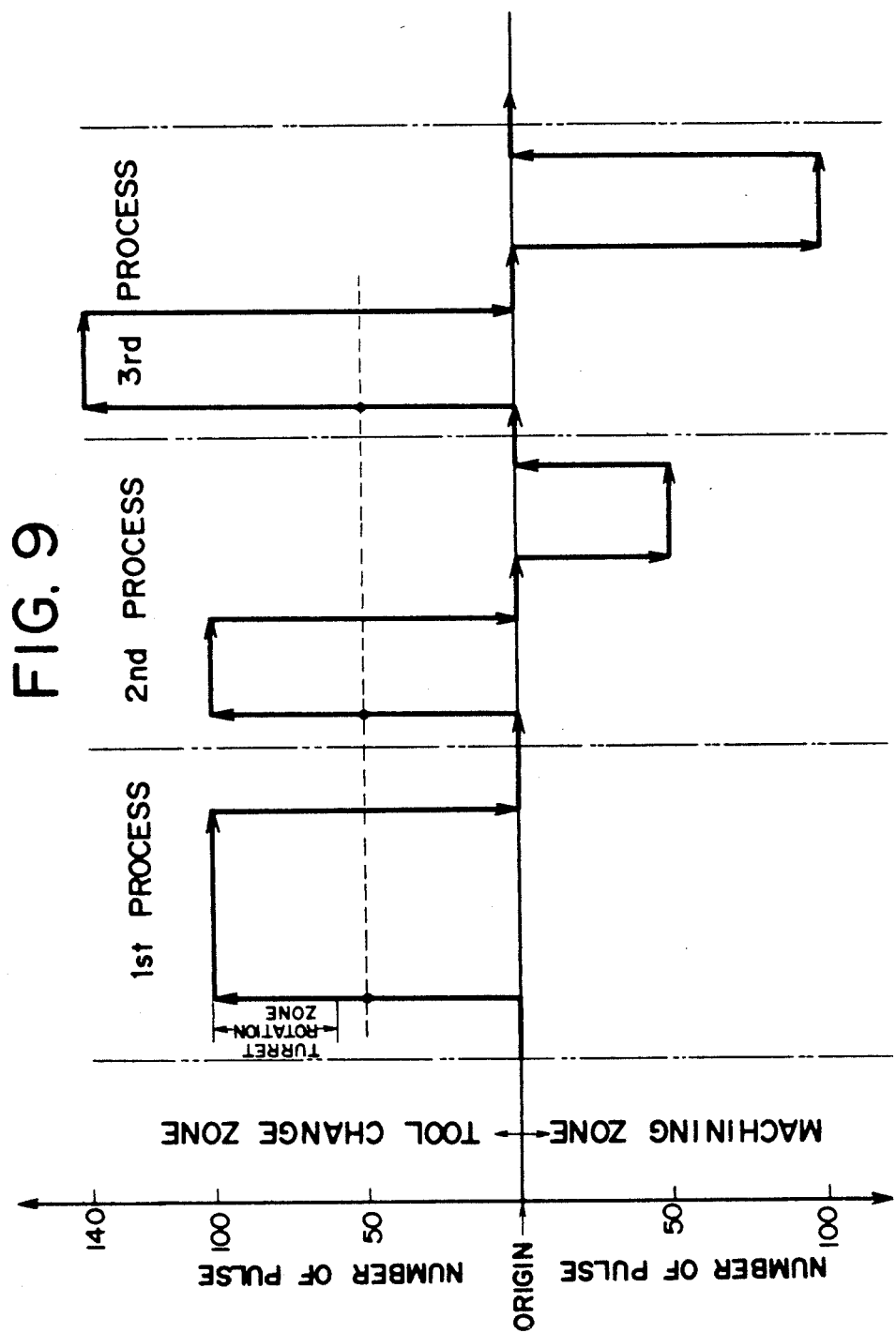

AUTOMATIC TOOL CHANGER OF MACHINING CENTER

BACKGROUND OF THE INVENTION

This invention relates to improvements in of a machining center capable of automatically performing a variety of machining operations such as drilling, tapping, boring, milling and the like.

Machining centers capable of performing milling by contouring control and drilling by various fixed cycles have been developed and are employed in many factories. Machining centers of this type are generally equipped with a spindle carrier capable of being moved up and down about an origin or "home" position located on a main column, and a turret for holding a number of tools which is capable of being moved downward from the home position. Tools are changed by exploiting the vertical movement of the spindle carrier from the home position to disengage a spindle from an arbor holding the upper end of an old tool, to rotate the turret to change tool positions, and then to re-engage the spindle with an arbor holding the upper end of the new tool, these operations being performed in the area above the home position. The turret then accompanies the spindle carrier in its movement to the area below the home position where machining is performed by rotating the desired tool via a spindle motor provided on the spindle carrier. Machining centers of this type have been disclosed in Japanese Published Unexamined Patent Application (Kokai) No. 51-12487, U.S. Pat. No. 4,053,251, and British Pat. No. 1,527,273.

The machining centers described above transport the spindle carrier by means of a vertical drive motor, which does not constantly rotate at a fixed speed.

For example, since it is necessary to reduce the speed of the vertical drive when the spindle carrier approaches its upper limit, the rotational frequency of the motor must be varied in accordance with the vertical position of the spindle carrier. The conventional machining centers accomplish such control of vertical drive motor speed through detection of spindle mechanism position by means of a plurality of sensing switches which are disposed on the main column along the path of the spindle carrier so as to be actuated by a projection provided on the spindle carrier. However, the number of sensing switches which can be mounted is limited owing to space restrictions. This inevitably reduces the number of speed control stages and therefore makes smooth control of speed impossible. Moreover, the sensing switches and the projection for actuating them are exposed and can therefore cause faulty machining center operation or breakdown if they are accidentally touched during a machining operation or during maintenance and inspection.

SUMMARY OF THE INVENTION

It is an object of the present invention to provide a machining center which can control a vertical drive motor without employing sensing switches.

It is another object of the present invention to provide a machining center which can detect the position of a spindle carrier without making use of sensing switches.

It is still another object of the present invention to provide an automatic tool changer for machining centers which can move a spindle mechanism at an optimum speed in relation to the position of the spindle carrier.

The novel features of the present invention are set forth in the appended claims, and other objects thereof will be apparent from an understanding of the following detailed description of a preferred embodiment. Numerous advantages not touched upon herein will also be readily apparent to those skilled in the art upon practicing the present invention.

BRIEF DESCRIPTION OF THE DRAWINGS

FIG. 5A is a partial side view of the spindle carrier shown as it begins to ascend from the home position;

FIG. 5B is a partial top view of the turret shown in the same state as illustrated in FIG. 5A;

FIG. 6A is a partial side view of the turret shown as it is about to be rotated;

FIG. 6B is a partial top view of the turret shown in the same state as illustrated in FIG. 6A;

FIG. 7A is a partial side view of the turret shown as it is being rotated;

FIG. 7B is a partial top view of the turret shown in the same state as illustrated in FIG. 7A;

FIG. 9 is a graph which represents a typical operational sequence of the spindle carrier.

DESCRIPTION OF THE PREFERRED EMBODIMENT

Figure 1:
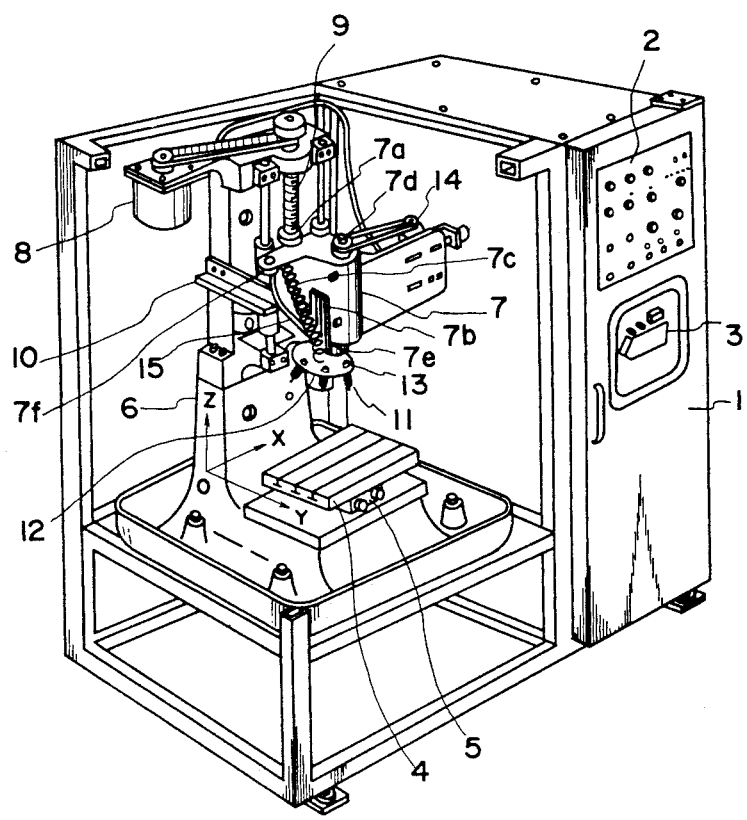
FIG. 1 is a partially broken away perspective of a vertical-type machining center which automatically changes tools by utilizing the motion of a spindle carrier.

Referring now to FIG. 1 showing a perspective view of a machining center, a control mechanism accommodating rack 1 houses such equipment as power circuitry and a numerical control unit. Mounted on the rack 1 are a control panel 2 and a tape reader 3 which is adapted both to receive a programmed tape and to read from the tape. The machining center includes a table 4 upon which a workpiece is set; a table drive mechanism 5 adapted to move the table 4 in both the X- and Y-directions; a main column 6 mounted on a pedestal and provided with a spindle carrier 7 adapted for vertical up and down movement in the direction of the Z-axis; a vertical drive motor 8 mounted on the upper end of the main column 6 and adapted to effect movement of the spindle carrier in the direction of the Z-axis; a freely rotatable screw shaft 9 mounted on the main column 6 and threadedly engaged with a nut portion 7a provided on the spindle carrier 7; a restraining member 10 fixedly secured to the main column 6; and a freely rotatable turret 12 mounted on the lower end of the spindle carrier 7 and adapted to mold a plurality of tools 11 which are free to rotate with the turret. The turret 12 is further adapted such that it can move freely up and down along the groove of a slide member 7b provided on the spindle carrier 7, the turret being constantly urged upward by means of a tension spring 7c. The spindle carrier 7 also provides support for a freely rotatable spindle 7d and is further equipped with a coupling member 7e attached to its lower end, and with a stopper plate 7f. The machining center further includes an arbor 13 provided at the upper end of each tool 11, a spindle motor 14 for rotating the spindle 7d, and a turret drive shaft 15 having universal joints 16 and 17. It should also be noted that a cylinder mechanism or a counter balance mechanism can be substituted for the spring 7c.

Reference will now be made to the remaining drawings for a detailed description of the mechanical operation of the automatic tool changing and machining sequences.

Figure 2:
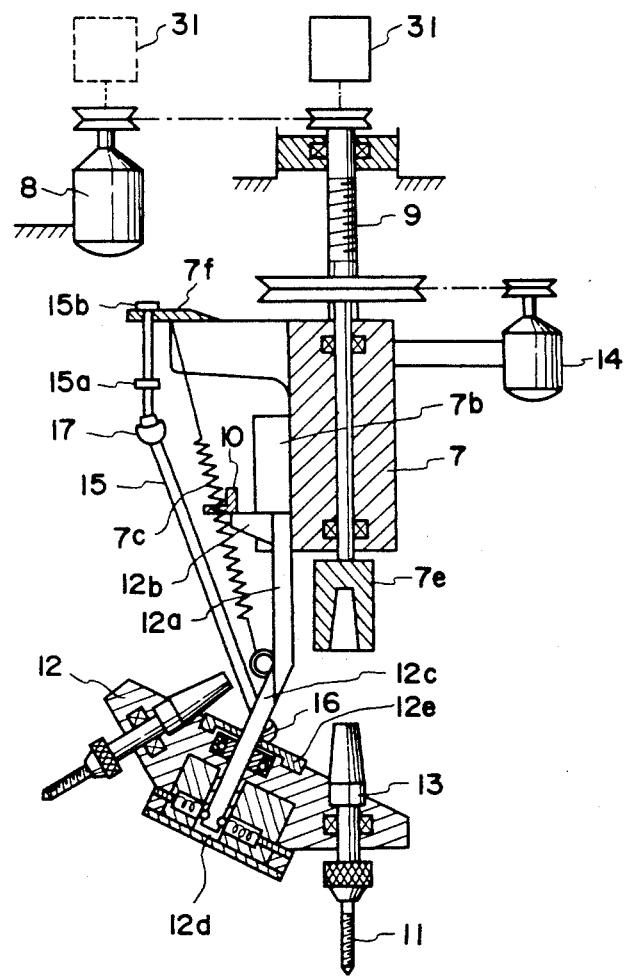
FIG. 2 is a partially broken away front view of a tool drive section.
Figure 3A:
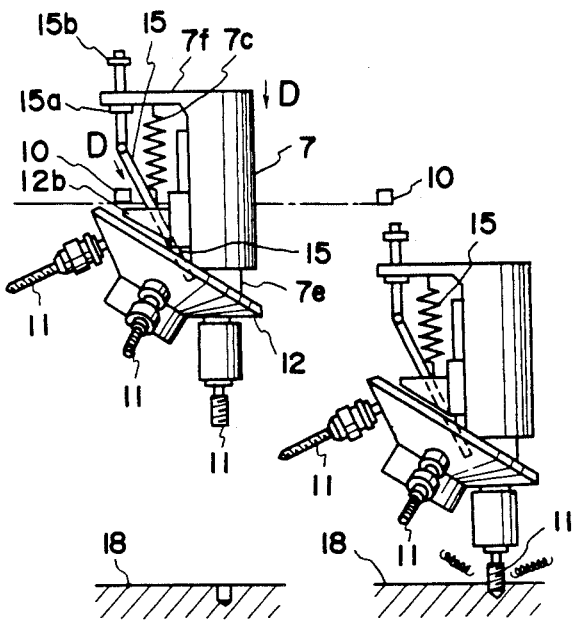
FIG. 3A is a partial side view of the spindle carrier shown as it begins to descend from the home position.
Figure 3B:
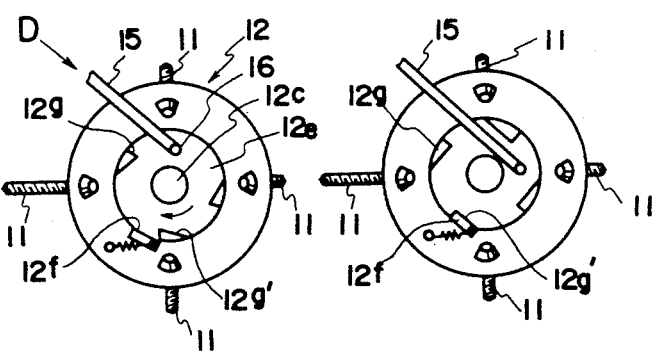
FIG. 3B is a partial top view of a turret shown in the same state as illustrated in FIG. 3A.

FIG. 2 illustrates the turret 12 in a state of rest as set by a positioning device 12d upon having been rotated about an axle 12c, and depicts a desired tool 11 which has been set in position directly below the coupling member 7e at the lower end of the spindle 7d. Applying power to the vertical drive motor 8 under these conditions rotates the screw shaft 9 to initiate downward movement of the spindle carrier 7. The turret shaft 12, however, since it is urged upwardly by the tension spring 7c, remains stationary as a projection 12b provided at the end of a slide rod 12a remains in abutting contact with the restraining member 10. As the spindle carrier 7 is lowered further a stopper plate 7f provided thereon abuts against a boss 15a on the turret drive shaft 15 and therefore pushes the turret drive shaft downwardly as shown in FIG. 3A. Hence, as shown in FIG. 3B, the end of the turret drive shaft 15, connected to a ratchet plate 12e via the universal joint 16, pushes the ratchet plate 12e and causes it to run idle, thereby disengaging a ratchet pawl 12f from a tooth 12g and directing it toward a following tooth 12g'. Lowering the spindle carrier further brings the coupling member 7e into fitting engagement with the arbor 13 to couple both members together and cause the ratchet pawl 12f to engage with the following tooth 12g'. At this stage power to the vertical drive motor 8 is cut off to halt the descent of the spindle carrier 7.

Figure 4A:
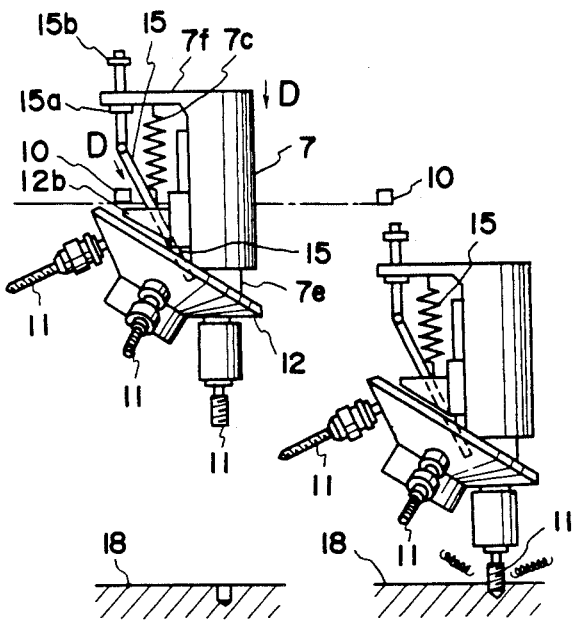
FIG. 4A is a partial side view of the spindle carrier shown at the machining position.
Figure 4B:
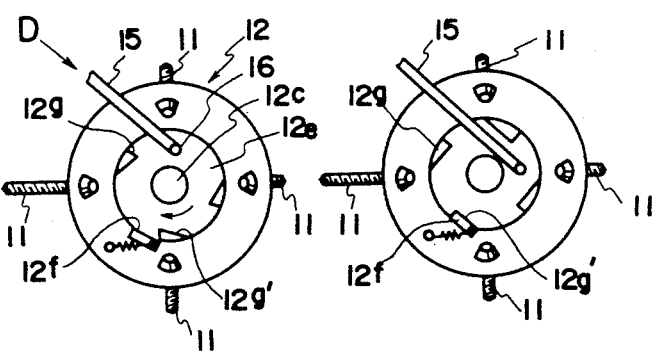
FIG. 4B is a partial top view of the turret shown in the same state as illustrated in FIG. 4A.

To carry out a machining operation the vertical drive motor 8 is restarted to lower the spindle carrier 7 and driving power is applied to the spindle motor 14 to rotate the tool 11 coupled thereto via the coupling member 7e. If the vertical drive motor 8 continues to run, the turret 12 will be lowered together with the descending spindle carrier 7 so that the tool 11 is allowed to reach the workpiece 18 to begin tapping the workpiece as illustrated in FIG. 4A. The state of engagement between the ratchet pawl 12f and the tooth 12g' during the machining operation is depicted in FIG. 4B.

When the machining has been completed both the vertical drive motor 8 and spindle motor 14 are caused to reverse their running directions. This causes the spindle carrier 7 to ascend and allows the tension spring 7c to pull up and hence raise the turret 12 which carries the tool 11 away from the workpiece 18. Once the prescribed elevation has been attained the spindle motor is turned off to stop the rotation of the tool 11. Meanwhile the spindle carrier 7 continues to be elevated by the still running vertical drive motor 8, but when the projection 12b provided on the upper end of the slide rod 12a abuts against the restraining member 10 the turret 12 can no longer ascend and comes to rest, at which time further upward movement of the spindle carrier 7 is temporarily halted. This condition is shown in FIGS. 5A and 5B.

To change to a different tool when the apparatus is in the state illustrated in FIGS. 5A and 5B, the vertical driver motor 8 is supplied with power to begin to elevate the spindle carrier 7 in the direction of the arrow U. This brings the stopper plate 7f into abutment with a stopper 15b provided on the end of the turret drive shaft 15, as shown in FIGS. 6A and 6B, and allows the stopper plate 7f to begin pushing the boss 15b upward, thereby raising the turret drive shaft 15, as shown in FIG. 7A. This causes the ratchet plate 12e to be rotated in the direction of arrow R by the upwardly moving turret drive shaft 15, as illustrated in FIG. 7B. At this time the ratchet pawl 12f rotates the turret 12 in the direction R' so that the turret 12 is positioned to thereby bring a different tool 11 mounted thereon into position directly below the coupling member 7e. When this has been accomplished, a stopper mechanism (described below) operates, and the vertical drive motor 8 is turned off. This restores the apparatus to the condition shown in FIG. 2.

It is to be noted that the vertical drive motor 8 is driven at a variety of speeds in accordance with the position of the spindle carrier 7 in the series of steps that effect the automatic tool changing and machining operations performed by the machining center of the present invention as described above. In the present invention, such speed control of the vertical drive motor, accomplished without requiring the use of sensing switches, is achieved by means of a system which will be described below.

Figure 8:
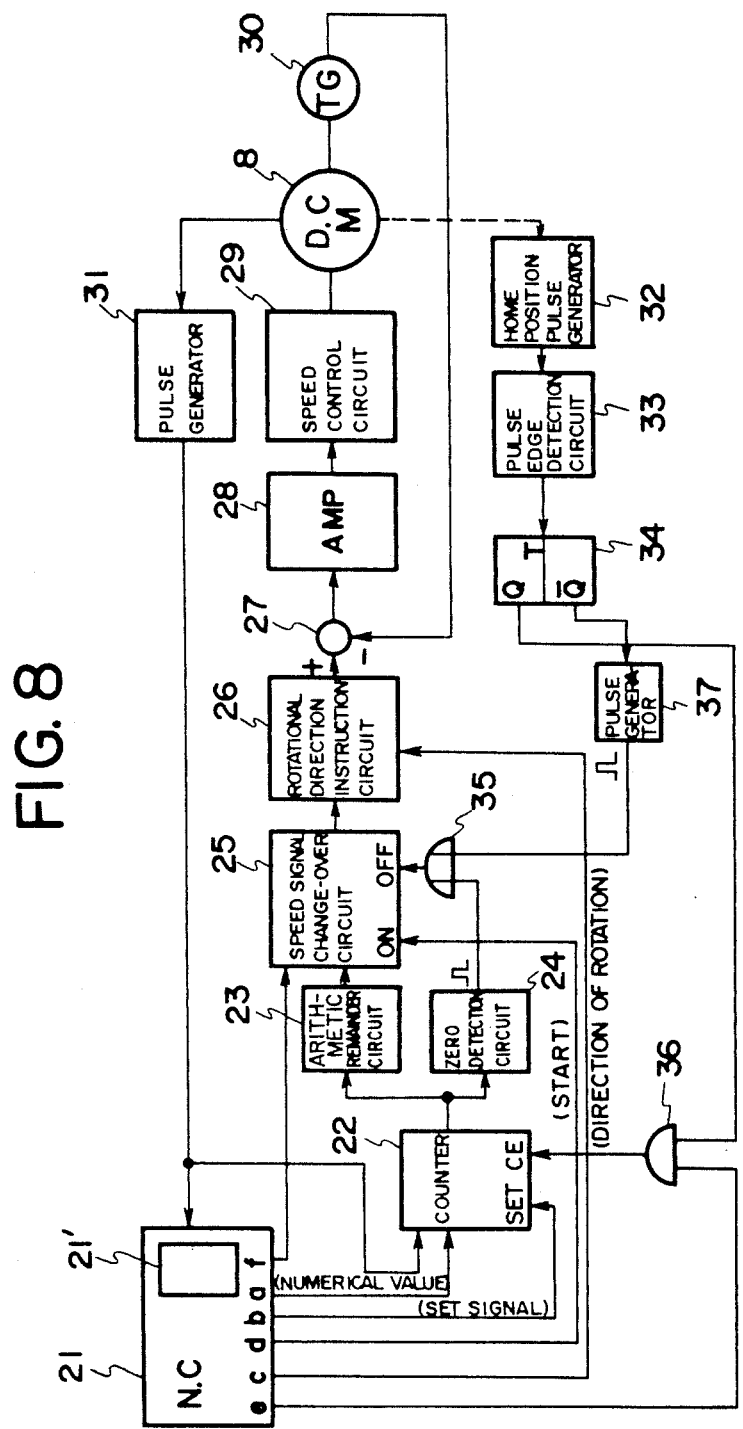
FIG. 8 is a block diagram illustrating the electric circuitry of a system for controlling a vertical drive motor that effects movement along the Z-axis.

FIG. 8 is a block diagram illustrating the electric circuitry of a system for controlling the vertical drive motor 8. Designated at 21 is a machining center numerical control section comprising a central processing unit, a memory unit which is composed of a read-only memory and a random access memory, as well as an input/output unit. The construction of such a numerical control unit is well known in the art and need not be described further since it is not central to an understanding of the present invention. The system also includes a down-counter 22, an arithmetic remainder detection circuit 23, a zero detection circuit 24, and a speed signal changeover circuit 25 adapted to issue an analog signal, representative of an absolute value, that dictates the rotational frequency of the vertical drive motor 8 in response to an instruction from the remainder detection circuit 23 and zero detection circuit 24 or from the numerical control section 21. A rotational direction instruction circuit 26 responsive to a command from the numerical control section 21 gives direction to the signal delivered by the speed signal change-over circuit 25. The output side of the instruction circuit 26 is connected to the input side of an error amplifier 28 through a summing or mixing point 27, and the output side of the amplifier 28 is in turn connected to the input side of a well-known speed control circuit 29, composed primarily of SCR's that feeds its output to the vertical drive motor 8. A tachometer generator 30 is connected between the motor 8 and the mixing point 27. A Z-axis position pulse generator 31 is adapted to generate one pulse each time the screw shaft 9 makes one revolution. The generation of these pulses, indicative of position along the Z-axis, can be effected by the following method, which may serve as one example: a code dial having a single slit or hole is mounted on the screw shaft 9 and interposed between a light-emitting element and a light-receiving element disposed so as to oppose each other. With such an arrangement the light-receiving element will issue a single pulse each time the hole or slit in the code dial passes between the light-emitting element and light-receiving element owing to the rotation of the screw shaft 9. It should be understood, however, that other arrangements are permissible so long as a pulse is generated for each revolution of the screw shaft 9. A home position generator 32 generates a logic "1" signal when the turret 12 is at the boundary of a tool change area and machining area as will be described later. The system further includes a pulse edge detection circuit 33 for detecting the passage of a home position pulse therethrough, that is, the edge of the pulse, a T-type flip-flop (hereinafter abbreviated as FF) 34, an OR gate 35, an AND gate 36, and a pulse generator circuit 37 adapted to generate a single pulse when the $\bar{Q}$ terminal of FF 35 changes from logic "1" to logic "0".

The apparatus and associated circuitry of the present embodiment as described above operate as follows. First, upon completing the machining of a workpiece by a desired tool, the spindle carrier 7 and the turret 12 mounted thereon are raised in the direction of the Z-axis. The position at which the projection 12b on the turret 12 first abuts against the restraining member 10 is taken as the origin or "home" position, with the region above the home position considered as the tool change area and that below the home position as the machining area. In accordance with the present embodiment, the spindle carrier 7 reaches its upper limit and indexes the turret 12 by one step at such time that the screw shaft 9 makes 100 revolutions beyond its home position to generate 100 pulses in the manner described above. If the screw shaft 9 is then rotated 100 times in the opposite direction to again generate 100 position pulses, the spindle carrier 7 will return to the home position. More specifically, when the screw shaft 9 has made 60 revolutions starting from the home position, the stopper plate 7f in its ascent abuts against the boss 15b to begin rotating the turret 12. The turret 12 continues to be rotated until the screw shaft 9 makes it 100th revolution, thereby indexing the turret 12 to effect the tool change.

Illustrated in FIG. 9 is a graph of typical machining center operation. In the series of processes shown by the graph, the only operation that takes place during a 1st process is the rotation of the turret 12 for the purpose of changing a tool. During the 2nd process the turret 13 is rotated to change the tool, and a machining operation follows. During the 3rd process the turret 12 is rotated two steps to change a tool, and this is then followed by a second machining operation. Moreover, in the present embodiment the spindle carrier 7 is adapted to ascend at a rate of 4.2 m/min from the home position until 50 pulses have been generated, and thereafter at a reduced rate of 2.5 m/min. The rotation of the turret 12 thus takes place when the spindle carrier 7 is in the region of reduced speed.

For a more detailed description of the foregoing operation, reference will now be had to the circuitry of FIG. 8. In changing a tool during the 1st process shown in FIG. 9, a numerical value of 100 appears at terminal a of numerical control section 21 and is set in the down-counter 22 when a numerical set signal appears at the terminal b of the numerical control section. A forward rotation command signal from terminal c is subsequently applied to the rotational direction instruction circuit 26, followed by the appearance of a start signal at the terminal d which now turns on the speed signal changeover circuit 25 and causes it to produce a speed signal indicative of an absolute value of 4.2 m/min. This signal in passing through the rotational direction instruction circuit 26 is converted to a forward rotation signal in accordance with the command signal from the terminal c, and is then applied to the mixing point 27. The signal then enters a closed loop formed by the error amplifier 28, speed control circuit 29, vertical drive motor 8 and tachometer generator 30 to thereby initiate forward rotation of the vertical drive motor 8. This rotation of the motor 8 is translated to rotation of the screw shaft 9 so that the spindle carrier 7 begins to be elevated at a rate of 4.2 m/min. At the instant of spindle ascent the output of the home position pulse generator 32 changes from logic "1" to logic "0", this transition being detected by the pulse edge detection circuit 33 which generates a pulse in response thereto. The pulse therefore reverses the state of FF 34 whose output signal Q goes to logic "1". Meanwhile, the terminal e of numerical control section 21 has been placed at logic "1" simultaneous with the issuance of the start signal at terminal d, with the result that AND gate 36 is opened to permit the down-counter 22 to be enabled by the signal Q at logic "1".

As the vertical drive motor 8 begins to rotate in the forward direction, the screw shaft 9 rotates in unison therewith so that the Z-axis position pulse generator 31 will generate a position pulse each time the shaft 9 makes one revolution. At the same time the coupling member 7e of the spindle carrier 7 begins to separate from the arbor 13. The generated position pulses are fed to the down-counter 22 which thus begins counting down from the set value of 100. The output of the down-counter 22 attains a value of 50 at such time that the coupling member 7e is completely separated from the arbor 13 by the ascending spindle carrier 7, whereupon the arithmetic remainder detection circuit 23 detects the numerical value of 50 and generates a change-over signal. Speed signal change-over circuit 25 is switched by the change-over signal and produces a speed signal equivalent to 2.5 m/min at its output terminal, thereby reducing the speed of the vertical drive motor 8 which now elevates the spindle carrier 7 at the slower rate of 2.5 m/min. When the screw shaft 9 has thereafter made 10 further revolutions, the stopper plate 7f of the spindle carrier 7 strikes against the boss 15b of the turret turret drive shaft 15 and thereafter pushes up the drive shaft which will subsequently rotate the turret 12 at a slower speed to effect a change of tools.

When the spindle carrier 7 has ascended to its upper limit and hence caused down-counter 22 to issue an output signal of numerical value zero, the zero detection circuit 24 detects the zero output and shuts off the speed signal change-over circuit 25. This cuts off the output from the change-over circuit 25 and therefore stops the vertical drive motor 8. The numerical control section 21 detects that the spindle carrier has reached its uppermost position by either detecting that the 100th position pulse has been generated or by receiving a signal from the zero detection circuit 24. Upon doing so a reverse rotation command signal is immediately applied to the rotational direction instruction circuit 26 from the terminal c and a speed signal equivalent to 4.2 m/min is applied to the speed signal change-over circuit 25 from the terminal f. Under these conditions no signals appear at the terminals a, b and d of the numerical control section 21, and the terminal e is at logic "0". Down-counter 22 is therefore inoperative.

When the speed signal change-over circuit 25 now delivers a speed signal, the vertical drive motor 8 will begin rotating in the reverse direction and will start lowering the spindle carrier 7. In the course of its descent, the spindle carrier 7 will mate the coupling member 7e with the arbor 13 of the new tool 11 and couple them together. After the coupling of the spindle 7d and tool 11 has been completed, the spindle carrier 7 reaches the home position, thereby causing the output of the home position pulse generator 32 to go to logic "1". This transition is detected by the pulse edge detection circuit 33 which then produces a pulse that reverses the state of FF 34 so that its output Q and $\overline{Q}$ go to logic "0" and logic "1", respectively. The $\overline{Q}$ output signal at logic "1" turns off the speed signal change-over circuit 25 whose output is therefore interrupted, thereby stopping the vertical drive motor 8. This completes the operation of one tool change cycle.

During the 2nd process as graphically illustrated in FIG. 9, a tool change operation is again performed as described above to couple a desired tool to the coupling member 7e of the spindle carrier 7. Thereafter numerical control section 21 produces the prescribed signals at the terminals c, d and f to begin lowering the spindle carrier 7. In response to this operation the output of the home position pulse generator 32 changes from logic "1" to logic "0", which transition is detected by the pulse edge detection circuit 33 that now issues a pulse. The state of FF 34 is again reversed by the pulse so that its output signals Q and $\overline{Q}$ go to logic "1" and logic "0", respectively. Driving power is then applied to the spindle motor 14 to drive the spindle 7d in the course of spindle mechanism descent. A machining operation such as drilling commences when the tool 11 reaches the surface of the workpiece. If the machining has been completed, a command signal from the numerical control section 21 stops the vertical drive motor 8 and then begins rotating it in the forward direction to rise the spindle carrier 7. The spindle carrier 7 subsequently reaches the home position and causes the output of the home position pulse generator 32 to change from logic "0" to logic "1". The pulse edge detection circuit 33 detects this transition and in response generates a pulse that again reverses the state of FF 34 whose outputs Q and $\overline{Q}$ thus go to logic "0" and logic "1", respectively. The output signal $\overline{Q}$ at logic "0" turns off the speed signal changeover circuit 25 whose output is thus removed. This halts the vertical drive motor 8 to complete one cycle of a machining process.

The 3rd process shown in FIG. 9 is merely a repetition of a process similar to that of the 2nd process. However, it should be noted that in this case the down-counter 22 of FIG. 8 has been set to a numerical value of 140, so that the ascending turret will be rotatively indexed two steps instead of one.

Similarly, the machining center performs 4th, 5th and all subsequent processes by repeating the processes described above, and in this manner continues the automatic machining of the workpiece.

In the foregoing embodiment a ring counter may be used in place of the down-counter. Moreover, the spindle carrier 7 as described in the foregoing embodiment stops at the home position, in order to simplify the operational description. However, the spindle carrier 7 can be made to pass through the home position without stopping there if the speed signal change-over circuit 25 is adapted so as to give priority to a command from the numerical control section 21.

In still another arrangement the Z-axis position pulse generator 31 can be connected directly to the vertical drive motor 8 instead of the screw shaft 9 as in the foregoing embodiment. Then, instead of the pulse generator 31 issuing a single pulse for each revolution of the screw shaft 9, a number of pulses could be generated for each revolution. Moreover, positional control of the spindle carrier along the Z-axis can be effected by a position control circuit 21' incorporated in the numerical control circuit 21. In this case the pulse generator 31 could be made to generate precision pulses (such as 2000 pulses/rev.), and a difference signal derived from the precision pulses and a value indicative of vertical position could be applied to the speed signal change-over circuit 25 which would control the motor 8 accordingly. This would enable extremely precise control of position along the Z-axis.

As described above, the present invention enables the rotational frequency of a vertical drive motor to be controlled on the basis of a numerical value which is the result of counting pulses indicative of position in the direction of the Z-axis, as distinct from the conventional apparatus which effects control of the tool change operation by relying upon sensing switches mounted along the Z-axis. The present invention therefore enables the rotational frequency of the drive motor to be finely controlled. The result is smooth tool change operations and smooth operation of the spindle carrier. In addition, the high efficiency of the tool change operation affords other advantages, such as a reduction in tool changing time.

While the present invention has been described in some detail with reference to a preferred embodiment, this description as it relates to the construction of the invention is not meant to be construed in a limiting sense, and various modifications in the combination and arrangement of components can be made without departing from the scope of the appended claims.

What we claim is:

1. An automatic tool changer of a vertical machining center of the type having a spindle carrier adapted to be moved up and down by a rotary drive source for spindle carrier drive, a turret capable of rotational and upward and downward movement provided on the spindle carrier, a member for interconnecting the spindle carrier and the turret for relative movement with respect to each other, a turret drive shaft connected at one end to the spindle carrier and at the other end to the turret, and a restraining member for blocking the upward movement of the turret so that tools are automatically changed through rotation of the turret caused by the relative movement between the turret and spindle carrier when the upward movement of the turret is blocked by the restraining member, comprising:

speed signal generating means for generating an analog signal representative of a command speed for the vertical drive motor;

tachometer generator means for generating an analog signal representative of the actual speed of the vertical drive motor;

mixing circuit means connected to both the speed signal generating means and the tachometer generator means for generating a speed difference signal;

speed control circuit means responsive to the speed difference signal for driving the vertical drive motor so as to reduce the difference to zero;

pulse generator means for generating a feedback pulse whenever the vertical drive motor rotates through a predetermined angle;

down-counter means for receiving a number corresponding to a predetermined movement of the spindle carrier, the content of the down-counter means being down counted every time the feedback pulse generator means generates a feedback pulse; and a monitor means for monitoring the content of the down-counter means and generating a speed changeover signal when the content reaches a predetermined value, wherein the speed signal generating means is responsive to the speed changeover signal and reduces the command speed of the vertical drive motor when the speed changeover signal is generated.

2. The automatic tool changer according to claim 1, wherein the content of the down-counter means reaches the predetermined value before the upward movement of the turret is blocked by the restraining member.

3. The automatic tool changer according to claim 2, wherein the monitor means comprises:

remainder detection circuit means for generating the speed changeover signal when the content of the down-counter means reaches the predetermined value; and zero detection circuit means for discontinuing the generation of the analog signal by the speed signal generating means when the content of the down-counter means reaches zero.

4. A position control system for receiving position command signals from a numerical control unit and transmitting motor control signals to a vertical drive motor which is operatively connected through a vertical drive screw to a spindle carrier of a vertical type machining center, comprising:

counter means for receiving from the numerical control unit a first predetermined number corresponding to a first predetermined position to which the spindle carrier is to be raised;

a position signal generating means, operatively connected to the vertical drive motor, for generating position pulses whenever the vertical drive motor rotates to raise the spindle carrier by a predetermined increment, the position pulses decrementing the content of the counter means; and means responsive to the content of the counter means for driving the vertical drive motor to raise the spindle carrier at a first velocity when the content of the counter means is greater than a second predetermined number and to raise the spindle carrier at a second velocity when the content of the counter means is less than the second predetermined number, the first predetermined number being greater than the second predetermined number.

5. The system of claim 4, wherein the means responsive to the counter means comprises monitor means for monitoring the content of the counter means and generating a speed changeover signal when the content of the counter means reaches the second predetermined number; and speed signal generating means for generating a first analog signal corresponding to the first velocity until the speed changeover signal appears and a second analog signal corresponding to the second velocity after the speed changeover signal appears.

6. The system of claim 5, wherein the monitor means additionally comprises means connected to the speed signal generating means for discontinuing the second analog signal to stop the rise of the spindle carrier when the content of the counter means is decremented to zero.

7. The system of claim 6, further comprising position detector means for detecting when the spindle carrier is raised to a second position beneath the first position, and means responsive to the position detector means for preventing decrement of the content of the counter means when the spindle carrier rises toward the second position.

* * * * *

UNITED STATES PATENT AND TRADEMARK OFFICE
CERTIFICATE OF CORRECTION

PATENT NO. : 4,355,446
DATED : October 26, 1982
INVENTOR(S) : Shimajiri et al.

It is certified that error appears in the above-identified patent and that said Letters Patent is hereby corrected as shown below:

Col. 1, line 6, delete "of";
line 36, "For example..." should be merged with previous paragraph;
line 67, "an automatic tool changer for" should be --a--;
line 68, "ters" should be --ter--.

Col. 2, line 66, "mold" should be --hold--.

Col. 3, line 62, after "motor" insert --14--.

Col. 6, line 47, delete "turret" (first occurrence).

Signed and Sealed this

Twenty-second Day of March 1983

[SEAL]

Attest:

GERALD J. MOSSINGHOFF

Attesting Officer

Commissioner of Patents and Trademarks